United States Patent
Campbell

(10) Patent No.: US 6,387,422 B1
(45) Date of Patent: May 14, 2002

(54) REDUCED CALORIE COATED CONFECTIONS

(75) Inventor: Bruce E. Campbell, Glenview, IL (US)

(73) Assignee: Kraft Foods, Inc., Northfield, IL (US)

( * ) Notice: Subject to any disclaimer, the term of this patent is extended or adjusted under 35 U.S.C. 154(b) by 2 days.

(21) Appl. No.: 09/698,509

(22) Filed: Oct. 26, 2000

Related U.S. Application Data

(63) Continuation of application No. 09/040,026, filed on Mar. 17, 1998, now abandoned.

(51) Int. Cl.[7] .................................................. A23G 3/00
(52) U.S. Cl. ........................ 426/103; 426/306; 426/660
(58) Field of Search ................................ 426/306, 103, 426/660

(56) References Cited

U.S. PATENT DOCUMENTS

| | | | | |
|---|---|---|---|---|
| 5,425,957 A | * | 6/1995 | Gaim-Marsoner et al. | 426/98 |
| 5,429,830 A | * | 7/1995 | Janovsky et al. | 426/94 |
| 5,527,556 A | * | 6/1996 | Frippiat et al. | 426/573 |
| 5,709,896 A | * | 1/1998 | Hartigan et al. | 426/103 |
| 5,939,127 A | * | 8/1999 | Abboud et al. | 426/572 |

* cited by examiner

Primary Examiner—Nina Bhat
(74) Attorney, Agent, or Firm—Fitch, Even, Tabin & Flannery

(57) ABSTRACT

An improved filling composition for coated confectionery products, particularly chocolate and chocolate-based confectionery products with an unrefrigerated shelf-life of more than about four weeks, when properly stored and handled is provided. Provided is a filling composition with a significant reduction in fat content, particularly in cocoa butter and other saturated fats, and a significant reduction in overall caloric content when compared to conventional chocolate-based, coated confections. This calorie reduction, for example, may be more than about 40% in a confection of the invention with a 1:1 ratio by weight of coating and filling when compared to similar conventional confections.

18 Claims, No Drawings

REDUCED CALORIE COATED CONFECTIONS

This is a continuation, of prior application Ser. No. 09/040,026, filed Mar. 17, 1998 now abandoned which is hereby incorporated herein by reference in its entirety.

FIELD OF THE INVENTION

The invention generally relates to reduced fat, reduced calorie confectionery products, particularly reduced fat, reduced calorie, coated chocolate confections.

BACKGROUND OF THE INVENTION

Confectionery products typically are formed from high calorie, high fat compositions made from a variety of fats, sugars, starches, flavorings, nuts and other similar ingredients. Such products include confections with high calorie, high fat, flavored filling mixtures coated by chocolates, chocolate-based coatings, sugared, fat containing coatings, or other such coatings that form a shell-like exterior around the high calorie, high fat filling.

In such coated confections, the filling mixtures typically are a major contributor to the organoleptic characteristics, flavor profiles, textures, and mouth feel characteristics of the confections. In many such coated confections, the fillings provide the dominant sweetness and flavor component of the confection. Thus, the organoleptic properties, dissolution rate and texture of the fillings frequently are a critical concern in ensuring that the confection meets the desired requirements for a commercially acceptable product. In addition, the shelf-life of the filling mixtures and their interactions with the shell-like coatings of such confections are a major factor in the storage conditions required for the confections and their expected shelf-life. Accordingly, the composition and properties of the filling mixtures as they affect the shelf-life of the confectionery products also are significant concerns both in the production of the products and in the development of new, improved confectionery products.

In conventional coated confections with chocolate or chocolate-based fillings, the flavor, texture and organoleptic qualities of the fillings normally are dependent on the fat components of the chocolate or chocolate-based components and also on the high calorie sweeteners, typically sucrose, used in such fillings. Cocoa butter generally is the predominant fat component in chocolate or chocolate based fillings. Cocoa butter has a relatively narrow, sharp melting point range that is sufficiently below normal body temperatures so that the chocolate fillings quickly melt in a consumer's mouth. Cocoa butter's rapid melting characteristic further allows for the rapid release of desirable volatile flavor components, and provides a viscous, flowable mass that provides desirable organoleptic, texture and mouth feel characteristics. The use of cocoa butter, in addition, allows for the suspension and fine dispersion of water soluble, high calorie sweeteners throughout the filling. Consequently, those sweeteners may be released from the filling quickly and without gritty or other unwanted residues.

Conventional high fat, high calorie chocolate fillings typically contain very low amounts of water, and thus have a low water activity or $a_w$. As referred to herein, the water activity of a confectionery product component or part of a component is a measure of the free water released by the product as a function of the water vapor pressure produced by the product or product component in a closed space. The $a_w$ is expressed as a ratio of this vapor pressure over the vapor pressure of liquid water at the same temperature. Water activity is commonly measured by determining the relative humidity of the air space above a product sample at room temperature, under controlled conditions, which then is divided by 100, the assumed relative humidity of liquid water under those conditions. In other words, a product that produced a relative humidity of 45% at room temperature has an $a_w$ of 0.45.

One benefit of low water contents in conventional high fat, high calorie fillings is that such fillings, in combination with conventional coating which also have a low $a_w$, provide a relatively long, unrefrigerated shelf-life when transported and stored under proper conditions. The low water contents and water activities of such confections, and particularly the fillings, inhibits the growth of undesirable spoilage and other microorganisms. The low water contents and $a_w$ of conventional coated confections also reduce the risk of deleterious effects on texture, appearance, organoleptic and other properties of the confections due to the presence of significant amounts of free water in the confection.

The release of appreciable amounts of free water from a confectionery product, particularly coated confectionery fillings, encourages the growth of undesirable microorganisms by providing a favorable environment for microorganisms in the presence of readily available food sources, e.g., the fats and sweeteners comprising the confection. Furthermore, the presence of free water in a coated confection often leads to the build up of fluids at the interface between the coating and the filling that can weaken or crack the coating, and may lead to partial dissolution of the water soluble components of the filling coating. If sufficient free water is released, then seepage from confection may occur producing an undesirable appearance, and contaminating surrounding products and surfaces.

The release of excess free water from such fillings further may result in water migration from the filling into the coating which can lead to a variety of coating failures, discoloration or dissolution of the coatings, as well as an undesirable alteration of the confection's appearance and texture. Further, the release of excess water in such products may lead to the hardening and increasing of the chocolate's melting point and the undesirable appearance of a "bloom" or presence of cocoa fats on the exterior surface of confectionery coatings.

The preferred water activity for the fillings used in coated confectionery products is usually less than about 0.8. This is below the water activity generally necessary to release sufficient free water to support significant undesirable microorganism growth and to cause significant undesirable functional changes in the fillings or the coatings used in conventional confections.

Conventional high fat, high calorie, coated chocolate or chocolate-based confections typically contain about 30% to 60% by weight sugar, about 10% to 70% by weight chocolate liquor (which contains about 50% by weight cocoa butter and finely ground cocoa bean), about 20% to 25% by weight added cocoa butter, and small amounts of other ingredients including nuts, fruits and flavoring. Not only do conventional chocolate confections commonly contain 30% to 34% by weight total fat in the form of cocoa butter, they are usually high in saturated fats. In many instances, such high concentrations of saturated fats in a confection is considered undesirable in view of the established adverse health effects of saturated fats in food products. Similarly, the combination of the amounts of fats in conventional chocolate confections and the relatively high sweetener content of such products results in a product with a relatively high caloric content which is undesirable for those on a reduced calorie diet by choice or due to medical necessity.

Consequently, there has been considerable interest in reducing the fat and calorie contents in coated confectionery products. Several of such efforts have focused on attempts to achieve significant fat and calorie reductions while obtaining flavor, texture, organoleptic and mouth feel properties very similar to, if not identical to those of conventional high fat, high calorie confections.

In one approach, the cocoa and other fats used in conventional confections are replaced by fat substitutes and fat mimetics. One effort using that approach was directed to developing reduced calorie chocolates using fat substitutes and mimetics that simulate the texture and organoleptic properties of cocoa butter, such as those described in Surber et al., U.S. Pat. No. 5,474,795 and the references cited therein.

In those efforts, a primary concern was the development of properties and processing procedures for fat substitutes and mimetics to provide them with organoleptic, rheological and thermal properties closely simulating cocoa butter and cocoa butter containing chocolate products. Such efforts included Surber et al.'s use of non-digestible fatty acids that mimicked the rheological and thermal properties of cocoa butter, and blends of such fat mimetics with sweeteners and flavoring agents, polyesters or polyethers. Others, such as Mentink et al., U.S. Pat. No. 5,360,621, used various polyols as sweetener substitutes and bulking agents for the same purposes. In another approach, such as discussed in De Soete et al., Int. Pub. WO 93/02566, undesirable fats and high calorie sweeteners were replaced with sugars with mixtures of inulins, fructo-oligosaccharides, polyols and other high-intensity sweeteners.

An alternative approach for reducing undesirable fats and high calorie sweeteners in chocolate based confectionery products is to substitute water for various amounts of cocoa butters and high calorie sweeteners. For example, Bodor, EPO Pub. No. 0,145,085, discloses a low calorie chocolate product using an edible, oil-in-water emulsion containing from 8%–70% by weight percent of a monosaccharide, an oligosaccharide, a polysaccharide or mixtures thereof, where at least 5% by weight of the mono-, oligo, or polysaccharide was in the form of crystals or solid particles that did not exceed 40 microns in size. In Cain et al., EPO Pub. No. 0,547,658A1, low calorie confectionery fillings are disclosed containing 5%–50% by weight of fat in a fat continuous emulsion with a water phase of 10%–60% by weight. The remaining 90% to 40% by weight of that product is an acidity regulator, thickener, bulking agent emulsifier, sweetener, flavor, colorant, humectant, and/or preservative.

However, the use of significant quantities of water to reduce fat and caloric content of confectionery products frequently causes significant undesirable changes in the chocolate products, particularly in coated, chocolate confectionery products. For example, the addition of water to many chocolate-based fillings increased the hardness and/or brittleness of the product, as well as the product's melting point, and may adversely affect the organoleptic and color properties of the product. In many products, the use of significant amounts of water to reduce fat or caloric contents produces products with unpleasant taste and organoleptic properties, gritty textures, and cracking and leaking problems. For example, Cain et al. reports several efforts to produce shelf stable coated chocolate products, but reported inconsistent results due to cracking and disruptions in the chocolate coating. Consequently, Cain et al. recommended the use of a second, sealing, coating surrounding its chocolate-based filling to protect against water loss from the filling and the resulting loss of product properties.

Thus, it is desirable to provide an improved, low fat, low calorie filling for coated chocolate-based product by replacing saturated and other fats and high calorie sweeteners with water to the extent possible. Such improved fillings should have a sufficiently low water activity to reduce, and possibly prevent, the release of free water from the filling in amounts that will adversely affect the coating layer, the microbiological stability of the product, and other organoleptic, taste and texture properties. It also is desirable to incorporate in such fillings fat mimetic that provide further calorie reduction opportunities and beneficial organoleptic, texture and other product properties.

SUMMARY OF THE INVENTION

The present invention provides an improved filling composition for coated confectionery products, particularly chocolate and chocolate-based confectionery products with an unrefrigerated shelf-life of more than about four weeks, when properly stored and handled. The invention provides a filling composition with a significant reduction in fat content, particularly in cocoa butter and other saturated fats, and a significant reduction in overall caloric content when compared to conventional chocolate-based, coated confections. This calorie reduction, for example, may be more than about 40% in a confection of the invention with a 1:1 ratio by weight of coating and filling when compared to similar conventional confections.

The filling of the invention comprises water, one or more fat mimetics, one or more reduced calorie sucrose substitutes, a flavoring composition mixture and a humectant. In one preferred embodiment, the fat mimetic also acts as an emulsifier for the water insoluble components of the filling and the sucrose substitutes also serve as humectants providing an $a_w$ of less than about 0.75. This filling composition typically is coated with a conventional chocolate and chocolate-based composition, as well as other conventional coating compositions.

In particular, the substitution of water for a relatively large proportion of the saturated fats typically found in conventional conversions permits significant fat reductions, and with the use of reduced calorie sucrose substitutes, significant reductions of the calorie content of the confections of the invention. The use of sucrose substitutes such as monosaccharides, sugar alcohols and artificial sweeteners, and polymeric reduced calorie carbohydrates allows for the use of lower calorie sweeteners with varying sweetness intensities. This provides additional flexibility in adjusting the balance of the confection's caloric content and its desired sweeteners levels. Lower molecular weight sucrose substitutes preferably are used to provide desired sweetness levels and as humectants to modify the water activity of the filling composition to achieve the desired unrefrigerated shelf-life and other previously mentioned advantageous properties.

In one preferred embodiment, the flavoring composition typically includes cocoa liquor mixtures, milk chocolate mixtures, or chocolate-hazelnut mixtures. Other confectionery flavors, such as nuts and nut oils, fruits and fruit oils and artificial fruit flavorings, mint oils and other conventional flavorings used in coated chocolate products also may be incorporated in the filling composition.

The water content of the filling may be supplied from the addition of liquid water during the preparation of the filling composition, as an ingredient of one or more components of the filling mixture such as milk, or from a combination of different sources. The amount of the total water content of the filling mixture will depend on the desired properties of the filling mixture and the expected composition of the final confectionery product. In one preferred embodiment, the water content of the filling composition is between about 15% to about 25% by weight. In this preferred embodiment, the amount of water incorporated in the filling composition permits significant fat and calorie reductions when compared to conventional high fat, high calorie confections, without significant adverse effects on the hardness, texture, mouth feel and organoleptic properties of the filling.

In one preferred embodiment, inulin or an inulin based composition is used as a fat mimetic to provide fat and calorie reduction, as well as improved organoleptic, texture and melting characteristics. The inulin component also is used to emulsify the water, water-based and fat-containing components of the filling. In that preferred embodiment, a sufficient amount of inulin also is used to provide gelling properties that ensure that the filling texture, consistency and viscosity is suitable for use with chocolate and chocolate based coatings. In this embodiment, the inulin component of the mixture is preferably about 20% by weight of the filling and may be up to about 50% by weight, as long as the inulin component provides sufficient texture and body to the filling composition.

In one preferred embodiment, the humectant used in the invention preferably is one or more of a reduced calorie sucrose substitutes, such as xylitol, the sugar alcohols, glycerol, erythritol, sorbitol, lactitol, maltitol, mannitol, isomalt and other low calorie, relatively low molecular weight carbohydrates and sweeteners. The humectants are present in amounts effective to maintain the $a_w$ of the filling preferably at less than about 0.75, and most preferably below about 0.7. Such water activities, in combination with the water activities of conventional coatings, provides a coated, confectionery product with an unrefrigerated shelf-life of at least 4 weeks and as long as six to twelve months when stored at typical room temperatures and unrefrigerated temperatures commonly accepted as suitable for storage of chocolate products.

Texture modifiers and builders such as starch maltodextrins, and starch systems such as tapioca, potato, rice and corn starches also may be incorporated in the filling of the invention as may be needed for certain applications. Similarly, various proteins also may be used as texture and mouth feel modifiers, such as egg whites, low bloom gelatins, casein, milk protein isolates and milk (homogenized, ranging from 18% by weight fat to skim milk). The preferred embodiment of the filling of the invention also may include preservatives such as sorbates, and butter or other fats for flavor or texture modification.

The preferred confectionery coatings are conventional chocolate coatings with a water activity, $a_w$, of about 0.2, or a similar chocolate-based coatings. Other non-chocolate coatings with water activities sufficiently low to provide an extended, unrefrigerated shelf-life when applied to the filling of the invention may also be used. Such coatings typically include white chocolates, fruit flavored coatings, and similar coatings with flavor profiles, hardness and molding characteristics suitable for coating chocolate or chocolate-based confectionery fillings.

The invention accordingly provides a reduced fat, reduced calorie confectionery product with a desirable and commercially acceptable texture, mouth feel flavor profile. The product is shelf stable under unrefrigerated conditions for at least about 4 weeks and may provide greater than 40% reduction in calorie content when compared to conventional filled, coated, chocolate confections. This is accomplished using a combination of fat reduction, moisture addition and sucrose substitute strategies to produce confectionery products with organoleptic, texture, taste and other properties comparable with milk chocolates, as well as other chocolate or chocolate-based compositions.

PREFERRED EMBODIMENT OF THE INVENTION

The confection of the invention preferably comprises a flavored filling composition covered or enrobed by a confectionery coating composition. The invention may also be used for molded, filled confectionery products which include products with a chocolate and hazelnut flavored, soft, readily meltable filling within a conventional molded chocolate shell.

The confectionery coating used in the invention typically includes conventional chocolate coatings, white chocolate coatings, fruit flavored coatings or similar conventional coatings or confectionery products. In addition, reduced fat and reduced calorie confectionery coatings may be used, subject to the coating's compatibility with the filling composition and the $a_w$ of the coating as it may affect the shelf-life of the confection. The coatings used in the invention generally are formulated with a relatively low water content and have an $a_w$ commonly in the range of about 0.1 to 0.3, and more preferably about 0.2. Confectionery coatings with a greater or lesser water activities also may be used where the water activities of the filling composition and the coating are adjusted to provide a desired unrefrigerated shelf-life of at least four weeks and preferably from six to twelve months.

The filling of the invention preferably is a combination of water, one or more fat mimetics, one or more sweeteners effective as sucrose substitutes, one or more humectants (which may include the sucrose substitutes), texture modifiers (where necessary), and a flavoring composition, typically a chocolate or chocolate-based composition, or a chocolate-hazelnut flavored composition. The filling composition also may include other components such as nut pieces, nut oils, fruit pieces, fruit oils and other flavorings or flavor components. The flavor components further may include emulsions of flavoring oils and water, with suitable emulsifiers.

To provide significant fat and calorie reduction, the cocoa butter and other saturated fats commonly found in conventional fillings are replaced with water in an amount sufficient to provide the desired fat content reduction and calorie reduction, while maintaining acceptable texture properties, organoleptic properties and a desired dissolution rate of the filling components. The amount of water used in a particular filling composition will vary depending on the specific filling and coating ingredients and, in particular, the amount and nature of the fat mimetic and sucrose substitutes used in the filling composition. The preferred water content of the filling is from about 15 to about 25% by weight, and most preferably about 20% by weight of the filling composition and may be varied depending on the particular use of the invention.

In one preferred embodiment, one or more humectant components are present in amounts effective to provide a predetermined water activity level for the filling alone, and in combination with the $a_w$ of the coating, sufficient to produce a shelf stable, commercially acceptable chocolate product with an unrefrigerated shelf-life of at least about four weeks, and as long as about six to twelve months or longer. Thus, by the effective choice of one or more humectants which affect the water activity of the fillings and by increasing or decreasing the amount of humectants, the water activity of the filling composition may be adjusted to provide a water activity sufficient to produce a predetermined minimum shelf-life.

The humectant components preferred for this purpose include relatively low molecular weight sugar alcohols including, for example, xylitol, glycerol, erythritol, sorbitol, lactitol (monohydrate, dehydrate or anhydrous), maltitol (crystalline or syrup), mannitol and isomalt. These sugar alcohols also preferably act as reduced calorie substitutes for the sucrose component of conventional confections. Thus, the preferred low molecular weight sucrose substitutes act in a dual role as humectant controlling the $a_w$ of the filling and providing significant source of calorie reductions in the filling.

As presently understood, any of the optical isomers and crystalline forms of such sugar alcohols (and other similar components) may be used as an appropriate humectants, and sucrose substitutes. In addition, several of the preferred sugar alcohols are commercially available as syrups which also may be used in the preferred filling. Other low calorie, low molecular weight carbohydrates that are sufficiently soluble in water to provide water activity control also may be used as effective humectants and sucrose substitutes depending on their particular properties and suitability for use in the filling of the invention.

In one preferred embodiment, the humectants used in the filling composition are effective, in combination with the other filling components, to produce an $a_w$ of less than about 0.75, and most preferably an $a_w$ below 0.7. The relatively low $a_w$ of the filling compositions, notwithstanding their relatively high water contents, discourages the growth of undesirable microorganisms, prevents cracking, substantially reduces the seepage or loss of liquids from the filling, and other adverse changes to the filling or coating composition under typical room temperature storage conditions. Evidence of such undesirable water loss often is apparent in conventional products from cracks and disruptions in the chocolate coating, condensation of water within the chocolate coating and dampness or noticeable leakage from the product, as well as unexpected and undesirable microorganism growth.

While not wishing to be limited by theory, it is believed that the lower molecular weight sucrose substitutes are a sufficiently soluble in the water component in the filling to repress the $a_w$ of that component, and to permit the effective adjustment of the water activity of the filling composition. Therefore, alternative candidates for humectants usable in the invention may be selected based on the solubility of such products and their effect on the $a_w$ of the water component of the filling and of the filling composition.

The use of sucrose substitutes as humectants further permits the use of such sucrose substitutes as calorie reduction components of the filling. Many of the preferred sugar alcohols and monosaccharides useful as humectants also have a lower calorie content and a sweetener level sufficient to permit the reduction, and in some instances elimination, of the sucrose component of conventional confectionery fillings.

Other alternative sucrose substitutes include monosaccharides such as fructose and dextrose. Fructose is available in crystalline form and as high fructose corn syrups and also provides the potential for formulating a product acceptable to individuals with diabetic conditions. Monosaccharides such as fructose and dextrose typically have calorie values similar to sucrose, but may be used to adjust the sweetness levels of the filling to allow for the optimal use of lower calorie sucrose substitutes employed for calorie reduction and humectant purposes. Similarly, artificial sweeteners also may be used for similar purposes.

Thus, the sweetener level of the filling composition may be adjusted for specific applications by using a combination of two or more sucrose substitutes with different sweetener levels for the filling. In one embodiment, multiple sucrose substitutes are used for calorie reduction and as humectants, allowing tailoring of the fillings $a_w$ to a desired level. In this embodiment, the sucrose substitutes xylitol, malbit and dextrose are used in different proportions to provide filling compositions with increased or decreased sweetness levels depending on the expected use of the filling. By using greater proportions of malbit and dextrose, the sweetness levels are increased; and by reducing the malbit and dextrose amounts, and increasing the amount of xylitol, the sweetness level is decreased. Similarly, by the use of multiple sucrose substitutes, the $a_w$ of the filling is adjusted to an appropriate level by further adjusting the amounts of malbit and xylitol in the filling. Thus, as mentioned above, such sucrose substitutes can be used to both provide desired sweetener levels and to assist in providing the desired shelf-life for the confectionery product.

In one preferred embodiment, the fat mimetic is inulin or related inulin-based polysaccharides. These naturally occurring and commercially acceptable fat mimetics have organoleptic, texture, melting and gelling characteristics suitable for use in food production. The inulin component of the filling is preferably about 20% by weight of the filling, and may be up to as much as about 50% by weight of the filling, as long as the inulin provides sufficient gelling properties to provide a firm, commercially acceptable filling product for the intended confectionery product.

The preferred inulin is referred to as Raftiline ST which is available commercially from Raffinerie Tirlemontoise S.A., Belgium, and can be prepared with water to produce a stable creme-like composition having acceptable organoleptic, texture and gelling properties. In addition, other forms of inulin may be used depending on commercial availability of such products and the desired properties of the fat mimetic component of the filling composition. Other fat mimetics such as polymeric carbohydrates (e.g, polydextroses) and cellosic systems may be used as well, subject to their acceptance for use in food products and properties suitable for use in the filling of the invention. Thus, the choice of such alternative fat mimetics will depend on the desired texture, organoleptic, flavor, physical properties and desired shelf-life of the filling. In some instances, fat mimetics suitable for use in the filling also may be used as sucrose substitutes based on their sweetness levels and caloric contents.

The preferred inulin product Raftiline ST may be used in a dry powder or crystalline form for ease of handling, although other forms of that product also may be used. When properly blended with water, this inulin product provides an opaque gel which sets and becomes stiffer over time to provide advantages in handling and dispensing of the filling during the production of the confectionery product. It generally is desirable to provide a filling that becomes stiffer and firmer in storage once filling is covered with a confectionery coating or dispensed into a confectionery shell. Furthermore, this gelled component provides desirable water retention, texture and organoleptic properties to the filling composition.

The flavoring component of the preferred filling composition typically provides the primary or dominant contribution to the overall flavor profile of the filling. The flavoring component preferably is prepared from a mixture of a generally water insoluble flavoring ingredients such as cocoa liquor mixed with a hazelnut paste. In that preferred embodiment, the water insoluble cocoa liquor and hazelnut paste flavoring mixture may be emulsified with the water soluble components of the filling or may be used to form a flavoring emulsion that may be combined with the other, water soluble components. This flavoring component preferably is about 10% to about 30% by weight of the filling and more preferably is about 20% by weight of the filling.

The flavoring component may include other flavoring compositions and oils such as fruit flavorings, chocolate substitutes, nut flavorings or other similar products conventionally used to flavor confections, including water soluble flavorings. In one such preferred embodiment, other flavor components such as caramel flavoring, butter and butter flavorings, and similar flavor modifiers are used in conjunction with cocoa liquor and hazelnut paste to provide a desired flavor profile for a specific application.

Other components of the filling (as well as the coating) also may affect the flavor profile of the confection. For example, in milk chocolate flavored fillings, the milk ingredient of the filling provides an important contribution to the overall flavoring profile. Thus, the amount of flavoring component used in the filling may be varied depending on the flavor profile desired for the confectionery product and the flavoring contributions of other ingredients of the confection.

In a preferred embodiment, the inulin or inulin based products used as a fat mimetic also act as an emulsifier for incorporating the flavoring components into the filling composition. Thus, in this preferred embodiment, the inulin component serves both to provide desirable organoleptic, texture and gelling characteristics, and as an important emulsifying component of the mixture used to provide the desired flavor profile to the filling composition. Other protein and non-protein emulsifiers also may be used depending on the desired filling properties and application.

As previously mentioned, the texture of the preferred embodiment of the filling is determined in significant part by the properties of the inulin and sucrose substitute components used in formulating the filling. The texture and mouth feel of the filling also may be modified by the use of starches, starch maltodextrines, and other starch systems such as those derived from tapioca, potato, rice and corn products. Various proteins also may be employed to modify the texture and mouth feel of the fillings, such as those derived from egg whites, low bloom gelatins, casein, milk protein isolates and milk.

For food safety purposes, preservatives may be added to the product including sorbates and other conventional preservatives that are used in small amounts and will not adversely effect the flavor, organoleptic or texture properties of the confectionery product.

The following are examples of a formulation and procedure for producing preferred embodiments of the invention. Unless indicated otherwise, all percentages are by weight.

EXAMPLE 1

The confectionery product of this example was produced by preparing and mixing the ingredients listed below to provide a filling for a chocolate confection. This filling was then coated with a conventional chocolate coating and the confectionery product was placed in storage to determine its expected shelf-life. The ingredients for the filling were as follows, with the approximate weight percentages of the filling:

| INGREDIENT | APPROXIMATE PERCENT BY WEIGHT OF FILLING |
| --- | --- |
| Cocoa Mix | 23.0% |
| Raftilin ST | 15.0% |
| Xylitol | 20.0% |
| Malbit | 12.4% |
| Dextrose | 5.0% |
| K-Sorbate | 0.1% |
| Caramel Flavor | 2.0% |
| Cream Flavor | 0.5% |
| Butter Fat | 2.0% |
| Water | 20.0% |

The cocoa mix was a mixture of about 28% cocoa liquor, about 44% of a whey protein sold under the trade name BiPro, and about 28% hazelnut paste. The cocoa liquor was prepared using conventional preparation techniques such as those discussed in Mentink et al., U.S. Pat. No. 5,360,621 which is incorporated herein by reference.

The following steps were used to prepare the example of the preferred embodiment of the invention:

A. Procedure For Preparing Cocoa Mix
  1. Combine cocoa liquor, hazelnut paste and whey protein in a conventional mixing bowl;
  2. Mix for about 10 minutes using a hard paddle until mixture is a homogeneous mass and the mixture is roll refined until it is suitable for measurement and combination with the other filling ingredients.

B. Procedure For Preparing Reduced Fat, Reduced Calorie Filling:
  1. Weigh all the dry ingredients;
  2. Measure and combine the dairy cream and caramel flavors with the cocoa mix in a large container;
  3. In a separate bowl equipped with a high shear mixing apparatus, measure sufficient amounts of water to form a creme mixture with the Raftiline ST inulin dry mix.
  4. Gradually add the Raftiline ST to the water, mixing the inulin and water combination at a low speed. As further inulin is added, the mixing speed should be gradually increased to maintain an efficient dispersion of the inulin and to form a mixture of water and inulin with a creme-like consistency and properties.
  5. Following the completion of the preparation of the inulin creme mixture, add the xylitol, dextrose, k-sorbate and malbit ingredients to the inulin creme to form a slurry of inulin creme and hydrated carbohydrates.
  6. Melt the butter fat and add to the slurry mixture and mix well to emulsify and disperse the butter fat.
  7. During the formation of the above emulsified slurry mixture, it is preferable to ensure that the ingredients are added in small portions and that each addition is thoroughly dispersed throughout the slurry to provide a smooth consistent emulsion and texture for the filling composition.
  8. Transfer the slurry mixture to a conventional water jacketed mixing bowl cooled to about 15° C.

9. Add the cocoa mix, dairy cream and caramel flavor mixture to the slurry mixture in three equal amounts, and after each addition mix thoroughly at low speeds to ensure that all the cocoa mix is fully emulsified and dispersed throughout the slurry mixture.
10. When all of the cocoa mixture is combined with the slurry, the filling composition is mixed at a high speed until the composition has a smooth texture as determined by qualitative observations.

The above filling composition may then be dispensed into forming molds or other suitable forming equipment where it will thicken over time and will become suitable for coating, dipping or filling of confectionery shells. Alternatively, the filling mixture may be dispensed directly to pre-formed coating shells with sufficient care taken to avoid raising the temperature of the filling to a level that may melt or distort the coating shell.

The filling produced following this procedure and using the above components had an $a_w$ of about 0.7, and was covered by a conventional chocolate coating with an $a_w$ of about 0.2. The final confectionery product had an expected shelf-life of at least from six to twelve months when stored under proper conditions, i.e., at about room temperature and without exposure to extreme temperatures, moisture levels or improper handling conditions. The filling of the example further had a desirable organoleptic and flavor profiles, a desirable mouth feel and satisfactory dissolution rate when consumed.

EXAMPLE 2

A second example of a preferred embodiment of the invention was produced using skim milk as the source of the water component of the filling. The ingredients for this example were as follows, with the approximate weight percentages of the ingredients:

| INGREDIENT | APPROXIMATE PERCENT BY WEIGHT OF FILLING |
|---|---|
| Cocoa Mix | 22.4% |
| Raftilin ST | 15.0% |
| Xylitol | 19.0% |
| Malbit | 12.0% |
| Dextrose | 5.0% |
| K-Sorbate | 0.1% |
| Caramel Flavor | 2.0% |
| Cream Flavor | 0.5% |
| Butter Fat | 2.0% |
| Skim Milk | 22.0% |

The cocoa mix was made following steps discussed above for Example 1. Similarly, the preparation of the filling also was made following the steps set forth above for Example 1, except that skim milk was substituted for the water during the water addition steps used to make the inulin creme mixture. The result provided a shelf stable product with an $a_w$ of about 0.80, an expected shelf-life of at least about 5 to 10 months, under proper storage conditions, and with desirable organoleptic, flavor, texture, mouth feel, and dissolution properties.

As an alternative to the above steps of the examples, the cocoa liquor, other flavoring oils or other flavor components, may be dispersed and emulsified into the inulin creme mixture used to prepare the filling during or immediately after the preparation of the inulin creme mixture. Such cocoa and flavorings may comprise up to at least 40% by weight of the filling and additional emulsifiers may be used to improve emulsification of the flavoring components. Similarly, the inulin component of the filling may be increased as much as to about 50% by weight of the total filling to provide further fat reduction or to provide designed texture, organoleptic, mouth feel or other properties to the filling.

Other modifications of the above examples include the addition of fructose to intensify the sweetness level and dextrose to reduce the sweetness level of the fillings, as well as a combination of both sweeteners to provide a desired balance of sweeteners level, texture, organoleptic and mouth feel properties. As previously mentioned, the combination of fructose and dextrose sweeteners in the examples has the additional advantages of permitting modification of sweetness levels while maintaining a desired water activity for the filling compositions of the examples as both sweeteners possess humectant properties when used in the filling of the invention.

Care must be taken when modifying the above-described fillings to ensure that such modifications will not adversely effect the texture, mouth feel and organoleptic properties of the product. For example, increasing the xylitol amounts may cause a drop in viscosity of the filling. Similarly, modifications of the sweeteners used in the product should take into account potential adverse effects on the texture and mouth feel of the filling, i.e., the introduction of a graininess or grittiness in the filling due to inadequate mixture of the sweeteners during the formulation of the filling, and sweeteners that do not dissolve with sufficient speed once consumed and masticated by a consumer. Similarly, care must be taken in the use of the fat mimetic and sucrose substitutes to ensure that adverse physiological effects such as those commonly known in the art are avoided.

When the confection products of the above examples were compared to conventional chocolate confection products, it was found the confection of the examples could be formulated to provide at least about 40% decrease in fat and caloric content with acceptable texture, mouth feel and flavor characteristics when used at a ratio of 1:1 by weight of the filling and the coating compositions. The flavor release from those product also was variable over time, and was considered sufficiently close to full calorie, full fat products to be considered a commercially acceptable confectionery product. Full fat and calorie reductions are obtainable by reducing the amounts of the coatings used, as well as by reductions in the fat and sucrose levels of the filling.

While the invention has been described by reference to certain specific descriptions and examples which illustrate preferred ingredients, compositions and preparation procedures, it is understood that the invention is not limited thereto. Rather, all alternatives and/or modifications within the scope of the invention so described are considered to be within the scope of the appended claims.

What is claimed is:

1. A reduced fat, reduced calorie confectionery product comprising a filling and a coating wherein said coating has a water activity of less than about 0.3, and wherein said filling has a water content of about 15 to about 25% by weight and consists essentially of a mixture of water, at least one fat mimetic, at least one sucrose substitute, a flavoring composition, and at least one humectant in an amount effective to maintain a water activity for the mixture of less than about 0.80 under unrefrigerated conditions for at least about four weeks.

2. The confectionery product of claim 1 wherein the water content of the mixture is at least about 15% by weight of the mixture.

3. The confectionery product of claim 1 wherein the mixture is covered with a confectionery coating having a water activity of less than about 0.2.

4. The confectionery product of claim 3 wherein the product has an unrefrigerated shelf life for the product of at least about 4 weeks.

5. The confectionery product of claim 4 wherein the filling comprises at least about 10% by weight of the flavoring composition, and the flavoring composition is generally water insoluble, comprising cocoa liquor.

6. The confectionery product of claim 4 wherein the filling comprises at least about 20% by weight of fat mimetic, at least one fat mimetic also acts as an emulsifier, and the product has texture, organoleptic and mouth feel properties similar to conventional coated, chocolate confectionery products.

7. The confectionery product of claim 6 wherein the product has an unrefrigerated shelf life of at least about five months.

8. The confectionery product of claim 1 wherein the water activity for the mixture is less than about 0.75.

9. The confectionery product of claim 8 wherein the water activity for the mixture is less than about 0.7.

10. The confectionery product of claim 1 wherein the filling comprises about 10% to about 30% by weight flavoring composition, the fat mimetic is inulin and at least one of the sucrose substitutes also acts as a humectant.

11. The confectionery product of claim 10 wherein the sucrose substitute comprises sugar alcohols.

12. The confectionery product of claim 1 wherein the fat content of the product is reduced at least by about 40% when compared to conventional full fat confections in products.

13. A reduced fat, reduced calorie confectionery product comprising a filling covered by a confectionery coating wherein said coating has a water activity of less than about 0.3, wherein the filling consists essentially of an emulsion of about 15 to about 25% by weight of water, at least about 20% by weight of one or more one fat mimetics, at least one reduced calorie sucrose substitute, at least one texture and mouth feel enhancer, at least one humectant, and cocoa liquor; wherein the filling has a water activity of less than about 0.8; and the confectionery product has an unrefrigerated shelf life of at least about 4 weeks.

14. The reduced calorie confectionery product of claim 13 wherein the confectionery coating is a low moisture content chocolate coating with a water activity of from about 0.2 to about 0.4.

15. The reduced calorie confectionery product of claim 14 wherein the water activity of the confectionery coating is not more than about 0.2.

16. The reduced calorie confectionery product of claim 15 wherein the texture and mouth feel enhancer is selected from the group consisting of food protein, food polymer carbohydrate and whole starch.

17. The reduced calorie confection of claim 13 wherein the filling comprises from about 15% to about 25% by weight water.

18. The reduced calorie confection of claim 17 wherein the filling comprises from about 20% to about 50% by weight fat mimetic.

* * * * *